3,503,898
CATIONIC POLYMERIZATION CATALYST
James J. Harris, Pittsburgh, Pa., assignor to Koppers Company, Inc., a corporation of Delaware
No Drawing. Filed Feb. 16, 1968, Ser. No. 705,924
Int. Cl. B01f 13/00; C08g 23/14
U.S. Cl. 252—429                                           1 Claim

ABSTRACT OF THE DISCLOSURE

Cationic polymerization catalysts are formed by the reaction of about one to twenty mole parts of a cyclic ether such as propylene oxide with one mole part of antimony pentafluoride in the presence of a solvent resistant to oxidation or fluorination. The catalysts exist as oily or greasy compositions and are useful in numerous cationic polymerization reactions.

BACKGROUND OF THE INVENTION

Antimony pentafluoride is a hygroscopic, corrosive, oily liquid melting at 7° C. having a boiling point of about 149.5° C. Generally, it is prepared by the reaction of antimony pentachloride and anhydrous hydrogen fluoride or by direct reaction of antimony metal with fluorine. Antimony pentafluoride is highly reactive and is used extensively to fluorinate organic compounds. Although antimony pentafluoride has some catalytic activity, it has been unsuitable as a catalyst because of its action as a strong oxidizing or fluorinating agent which inevitably results in the formation of large amounts of char when contacted, under polymerization conditions, with various monomers. In addition, antimony pentafluoride, because of its reactivity, is dangerous to handle and difficult to safely use.

It has now been found that, surprisingly, a complex is formed by the reaction of one mole part of antimony pentafluoride with from about one to twenty mole parts of a cyclic ether, in the presence of a solvent resistant to oxidation and fluorination, which complex is readily handled and exhibits a high degree of catalytic activity for polymerization reactions. The formation of the complex is highly unexpected in view of the fact that $SbF_5$, in attempted reactions, generally destroys most suitable complex-forming organic compounds, as noted by L. Kolditz on page 118 of the chapter on Halides of Arsenic and Antimony in the text Halogen Chemistry, vol. 2, Victor Gutman, Academic Press (1967). The complex catalyzes polymerizations of cyclic ethers or vinyl ethers to give high molecular weight polymers at high catalyst efficiencies.

SUMMARY OF THE INVENTION

The reaction of about one to twenty mole parts of a cyclic ether having 2–8 carbon atoms in the ring containing the ether linkage with one mole part antimony pentafluoride in a solvent resistant to oxidation or fluorination, produces a catalyst useful in cationic polymerization reactions. The catalyst is in the form of an oil or a greasy composition and is readily handled. The catalysts of the present invention have very high catalytic activity and properties superior to other cationic polymerization catalysts.

DETAILED DESCRIPTION

The highly reactive catalysts of the present invention are prepared by reacting one mole part of antimony pentafluoride ($SbF_5$) with from one to about twenty mole parts of a cyclic ether having 2–8 carbon atoms in the ring containing the ether linkage.

Suitable cyclic ethers that form a complex with antimony pentafluoride are propylene oxide, tetramethylene oxide, phenyl glycidyl ether, 1,3-dioxolane, styrene oxide and the like. The preferred cyclic ether is propylene oxide. With propylene oxide the formula of the catalyst would correspond to the formula:

$$SbF_5 \cdot (C_3H_6O)_X$$

where X would be a number of from 1 to 20.

The amount of cyclic ether used can be varied from about one to twenty mole parts per mole parts of antimony pentafluoride. Lesser amounts will not form catalysts having the properties of the complexes of the present invention while greater amounts give no benefits and are undesirable.

The antimony pentafluoride is contacted with the cyclic ether in the presence of a solvent that is resistant to attack by the antimony pentafluoride. Suitable such solvents, resistant to oxidation or fluorination, are the Freons (halogenated hydrocarbons having one or more fluorine atoms in the molecule) methylene chloride, other halogenated organic compounds, sulfur dioxide, and the like. The solvent plays a critical role in the reaction, where oxidation or fluorination of the cyclic ether used is probable, to moderate the oxidizing potential of the antimony pentafluoride.

The temperature used during the catalyst formation can vary over a wide range, with temperatures in the range of −50° C. to about 100° C. being usable, depending upon the reactants and solvent used.

The reaction time for the catalyst preparation can also be varied greatly. Since the reaction is generally quite vigorous, the lower limit of reaction time is determined by the ability to control the exotherm of the reaction and is in the order of a few minutes reaction time. The upper limit can be hours, but no advantage is found in extending the reaction time. Preferably, the reaction is carried out during a 10–60 minute period.

To recover the catalyst, it is only necessary to remove any remaining volatiles in the reaction system and the oily or greasy residue can be used as such. If desired, the catalyst can be dissolved in a suitable solvent and filtered to remove minute quantities of impurities, but such purification is not necessary.

The novel catalysts have been found to be especially useful for the cationic polymerization of cyclic ethers and vinyl ethers. Examples of cyclic ethers which can be polymerized are those having 2–8 carbon atoms in the ring containing the ether linkage, such as propylene oxide, ethylene oxide, styrene oxide, tetrahydrofuran (trimethylene oxide), cyclohexane oxide, 1,3-dioxolan, epichlorohydrin, diglycidyl ether of bis-phenol A, phenyl glycidyl ether, and the like. Examples of vinyl ethers which can be polymerized are ethyl vinyl ether, divinyl ether and other vinyl ethers of the formula:

$$ROCH=CH_2$$

where R is selected from an alkyl group and an alkenyl group having from 1–10 carbon atoms.

The amount of catalyst used for the polymerization of cyclic ethers or vinyl ethers should be generally within the range of $10^{-4}$ to 1 mole percent, i.e., moles of catalyst per mole of monomer to be polymerized. It has been found that molecular weight of the polymers increases slowly with decreasing concentration of catalyst.

The temperature range for such polymerizations can be varied over a wide range. Temperatures can be used in the order of −78° C. to about 150° C. With the cyclic ethers, temperatures are preferably −20 to 150° C. For the vinyl ethers, preferred temperatures are in the order of −78 to 60° C. The polymer yields generally increases with an increase in the reaction temperature.

The polymerizations can be carried out as bulk polymerizations, in the absence of solvents or various solvents may be used as diluents for such polymerizations. Aromatic or aliphatic hydrocarbons such as heptane, benzene, acrylonitrile, nitrobenzene, and halogenated derivatives such as methylene chloride or chloroform are useful as solvents in the polymerizations. In effect, any aprotic solvent having the desired solubility and boiling point are usable as diluents.

The invention is further illustrated by the following examples wherein parts are parts by weight unless otherwise indicated.

EXAMPLE I

A stirred mixture of 7.48 g. (0.035 mole) of antimony pentafluoride in 125 ml. of Freon 113 was treated slowly with 10.4 g. (0.179 mole) of propylene oxide at 0° C. A very strong exothermic reaction resulted and the mixture darkened considerably. The mixture was gradually warmed to room temperature and volatiles removed to leave a residue of 18.3 g. of a black viscous product that was very reactive toward propylene oxide. A 9.0 g. sample of the viscous product was dissolved in 75 ml. methanol and filtered twice. The volatiles were removed from the filtrate at reduced pressure to give 8.7 g. dark syrup as residue. The syrup was highly reactive toward propylene oxide.

EXAMPLE II

An aliquot of the catalyst produced in Example I was dissolved in methylene chloride. An aliquot of this solution containing $1.43 \times 10^{-5}$ moles of catalyst (based on the antimony content) was charged to a tube polymerization reactor. The methylene chloride was removed at reduced pressure to leave the catalyst residue. To the catalyst there was added 8.31 g. of propylene oxide monomer. The mixture thus contained 0.01 mole percent of catalyst. The tube and contents were heated to 60° C. and after a 90 hour period, the polymer recovered. The reaction produced polypropylene oxide in a 93.5% yield.

EXAMPLE III

To each of five polymerization tubes, there was charged aliquots of the catalyst of Example I in methylene chloride solution. After removal of the methylene chloride, propylene oxide was fed to the tubes and the mixture polymerized as in Example II. The amounts of catalyst (based on antimony content) and propylene oxide used and the results of the polymerization are listed in Table I.

TABLE I

| Experiment | 1 | 2 | 3 | 4 | 5 |
|---|---|---|---|---|---|
| Propylene oxide (g.) | 8.31 | 8.31 | 8.31 | 5.8 | 5.8 |
| Catalyst of Example I: | | | | | |
| Moles | $7.15 \times 10^{-6}$ | $3.6 \times 10^{-6}$ | $1.43 \times 10^{-6}$ | $1.0 \times 10^{-6}$ | $5.0 \times 10^{-7}$ |
| Mole percent | 0.005 | 0.0025 | 0.001 | 0.001 | $5.0 \times 10^{-4}$ |
| Polymer yield | 90.3 | 85.5 | 83.7 | 68.5 | 60.0 |
| Mv | 7670 | 5690 | 18,200 | | |

EXAMPLE IV

A series of experiments were run to compare the catalysts of the present invention with a conventional cationic catalyst, anilinum tetrafluoroborate. The polymerization of propylene oxide was carried out generally according to the procedure of Example II, except that no methylene chloride was used with the borate catalyst. The results of the polymerizations are listed in Table II.

TABLE II

| Experiment | Catalyst | Amount Catalyst | Yield Polymer, Percent | Polymer Yield g. polymer/ mole catalyst |
|---|---|---|---|---|
| 1 | Anilinum tetrafluoroborate. | 0.1 | 13 | $7.5 \times 10^3$ |
| 2 | do | 0.05 | 6 | $7.0 \times 10^3$ |
| 3 | do | 0.025 | 3.5 | $8 \times 10^3$ |
| 4 | do | 0.01 | 0.8 | $5 \times 10^3$ |
| 5 | Product of Example I. | 0.01 | 93 | $5.4 \times 10^5$ |
| 6 | do | 0.005 | 96 | $1.05 \times 10^6$ |
| 7 | do | 0.0025 | 86 | $1.97 \times 10^6$ |
| 8 | do | 0.001 | 84 | $4.85 \times 10^6$ |

Thus, the catalyst yields from the antimony pentafluoride-propylene oxide reaction product are 200 times that found using the conventional borate catalysts.

EXAMPLE V

The polymerization of ethyl vinyl ether is readily carried out using a catalyst produced according to the procedure of Example I to give a polyethylvinyl ether.

I claim:
1. A catalyst characterized by a high efficiency when used for cationic polymerization consisting essentially of the reaction product formed by the reaction of one mole part antimony pentafluoride and from one mole part to twenty mole parts of a cyclic ether selected from the group consisting of propylene oxide, phenyl glycidyl ether and styrene oxide, said reaction being carried out at a temperature in the range of from −50° C. to about 100° C., in a solvent resistant to oxidation and fluorination by said antimony pentafluoride.

References Cited

UNITED STATES PATENTS

| | | | |
|---|---|---|---|
| 3,449,267 | 6/1969 | May et al. | 252—429 XR |
| 2,423,045 | 6/1947 | Passino et al. | 252—429 XR |
| 2,511,013 | 6/1950 | Rust et al. | 260—446 |
| 3,109,853 | 11/1963 | Worsley et al. | |
| 3,389,093 | 6/1968 | Busler et al. | 260—446 XR |

PATRICK P. GARVIN, Primary Examiner

U.S. Cl. X.R.

260—2, 91.1, 446